United States Patent Office 2,915,445
Patented Dec. 1, 1959

2,915,445

FORMATION OF INTERMETALLIC COMPOUND DISPERSIONS

Joseph Sanson Bryner, Eastport, N.Y., assignor to the United States of America as represented by the United States Atomic Energy Commission No Drawing. Application June 22, 1955
Serial No. 517,403

3 Claims. (Cl. 204—154.2)

The present invention relates to the formation of liquid metal compositions containing dispersed intermetallic compounds of metals.

In order to produce useful power from fissionable or fertile metals, such as uranium, thorium and plutonium, it is necessary to transfer heat produced from the fissioning of the fuels to an apparatus capable of converting heat into other forms of useful energy. The fertile metals such as thorium must in addition be converted to fuel before the fission process can be carried out. To facilitate the rapid removal of heat as it is produced, provision of a good heat transfer medium in thermal contact with the fuels is highly desirable. It has been proposed to employ liquid metal media for this purpose, because of their heat transfer properties, and to incorporate the fuels directly in the liquid metal in the form of dispersoids of intermetallic compounds of the fuel metal and liquid metal. It has also been proposed to include fertile metals such as thorium and uranium-238 in liquid metal media as dispersions of intermetallic compounds so that they may be subjected to neutron irradiation in this form and converted to fuels. The choice of liquid metal media is limited because of the unusual combination of properties required for use in connection with reactors. Only a few metals, including lead and bismuth, have the needed properties. The use of dispersions of intermetallic compounds of uranium and thorium in bismuth and lead-bismuth media is described in the copending application of R. J. Teitel, S.N. 511,809.

The circulation of liquid metal compositions through a nuclear reactor is expected to be carried out at relatively high flow rates, particularly when useful heat is to be removed from the reactor. Appreciable differences in density between the dispersion and the liquid metal may cause concentration of the dispersed solid at some point in the liquid metal flow system. To facilitate control of the uniformity of distribution of the dispersoid in the dispersing medium, it is desirable that the dispersoid consist principally of relatively small equiaxed particles. It is particularly desirable to have equiaxed rather than platelet or needle shaped particles because of the superior flow qualities of the equiaxed particle dispersions. Platelets tend to pile up at the entrance to constricted flow passages such as those found in heat transfer apparatus.

It is one of the objects of the present invention to provide solid intermetallic compositions of fertile and fissionable materials in liquid media in the form of dispersoids having desired particle size. It is another object of the present invention to provide a method for forming such compositions. It is a further object to provide a method for forming intermetallic dispersoids of thorium in equiaxed form in liquid metal. Other objects will be in part apparent and in part pointed out hereinafter.

In one of its broader aspects, the objects of the present invention are achieved by selecting a specimen of thorium metal in a form having one dimension not greater than 0.015 inch and immersing a quantity of the selected metal in a liquid metal composition comprising bismuth and less than 80% lead by weight, the quantity being in excess of the solubility of the selected metal in the liquid metal.

Intermetallic bismuthides of thorium may be formed by dissolving thorium at a higher temperature in a liquid bismuth bath and allowing the bath to cool below a point at which the solubility of the thorium metal is exceeded. The bismuthide precipitates in the form of a dispersion of platelets. These platelets may have a length, or width, to thickness ratio in the order of 100. The platelets may settle to form a composition which, at its normal settled bulk density, contains as little as 2% of thorium. The flow properties of such compositions are extremely poor since an attempt to pass them through narrow flow passages, for example the small diameter tubes of heat exchangers, may result in their bridging across the entrance to the tube and effectively blocking the flow therethrough.

It has been found that liquid metal compositions containing equiaxed dispersoids, i.e. dispersoids, the particles of which have approximately equal dimensions in all directions through their centers, can be prepared by immersing the metal in the form of chips or foil averaging 0.005 to 0.015 inch in thickness into the heated liquid metal bath. For this preparation, a lower temperature limit of about 500° is preferred because the rate of formation of dispersion below this temperature is negligible. The preferred upper temperature is that at which less than 12% by weight of the thorium metal is soluble in the liquid metal because dispersions containing more than 12% of the dispersed element can not be made to flow easily at the preferred temperature for the production of steam. The preferred upper temperature is about 1100° C. for thorium metal in bismuth. Dispersoids can also be prepared from metal specimens having a smallest dimension larger than 0.015 inch but the preparation is slower. With sufficient time the dispersoids can be prepared from bar material. For this purpose the liquid metal should be circulated past the bar to remove the formed dispersoid as it exfoliates from the surface thereof.

The preferred temperature range for the formation is between 500 and 600° C. since when compositions are formed above 600° C. and cooled, some platelets are formed as the composition cools and the percentage of platelets increases with increasing temperature of initial preparation. The formation of platelets on cooling from the higher temperatures may be avoided by agitation of the liquid. Compositions formed at approximately 500° C. have particles, the largest dimension of which ranges downward from 40 microns, the major fraction being in the 30 micron range. Particles having larger dimensions can be prepared at higher temperatures. In general, it has been found that raising the temperature of the liquid dispersion medium by 100° C. increases the average particle size by approximately 10 microns.

The following are examples of the preparation of the desired intermetallic compound dispersions according to the subject method:

*Example I*

Five grams of thorium metal in the form of milling chips having an average thickness of about 0.010 inch were placed in a graphite crucible together with ninety-five grams of metallic bismuth in the form of a solid bar. The crucible and contents were placed in a vacuum furnace and heated to about 500° C. under vacuum. After two hours at this temperature the crucible and contents were cooled, removed from the vacuum furnace and sectioned vertically by sawing. The section was polished and examined metallographically under a microscope. It was observed that all of the thorium had reacted with the bismuth to form equiaxed particles of thorium bismuthide, the largest particle of which was approximately 30 microns in its largest dimension. The particles were dispersed in the excess bismuth.

*Example II*

Fifty-six grams of bismuth and thirty-nine grams of lead were placed in a graphite crucible and five grams of thorium chips having thickness of approximately 0.010 inch were added to the crucible. The contents were heated in a vacuum furnace under vacuum to about 600° C, for about two hours and cooled. Microscopic examination of the polished vertical section revealed that all of the thorium had reacted with the bismuth to form equiaxed particles of thorium bismuthide of which the largest particle was approximately 40 microns. The particles were dispersed in the bismuth-lead eutectic whose composition is 55.5% bismuth and 44.5% lead by weight.

From the foregoing, it is apparent that the present method provides a very effective and simple procedure for preparing finely divided dispersions of thorium bismuthides in liquid bismuth and lead bismuth compositions.

Since many embodiments might be made in the present invention and since many changes might be made in the embodiment described, it is to be understood that the foregoing description is to be interpreted as illustrative only and not in a limiting sense.

I claim:

1. The method of preparing a dispersion containing an intermetallic dispersoid of thorium in equiaxed form, the largest particle of said dispersoid being approximately 50 microns, which comprises providing said metal in a solid form having one dimension not greater than 0.015 inch, immersing a quantity of said solid metal in a liquid metal composition consisting essentially of bismuth and less than 80% lead by weight, the quantity of said metal being in excess of its solubility in said liquid metal, and maintaining the liquid metal composition at a temperature between about 500 and 600° C.

2. The method of preparing a dispersion containing a dispersoid of thorium bismuthide in equiaxed form and having an average particle size in the order of 30 microns which comprises providing thorium metal in a solid form having one dimension not greater than 0.015 inch and immersing a quantity of said solid metal in a liquid metal composition at a temperature between 500 and 600° C. consisting essentially of bismuth and less than 80% lead by weight, said quantity being in excess of the solubility of said metal in said liquid.

3. The method of preparing in equiaxed form an intermetallic dispersoid of thorium bismuthide having an average particle size in the order of 30 microns which comprises providing thorium metal in a solid form having one dimension not greater than 0.015 inch and immersing a quantity of said solid metal in liquid bismuth at a temperature between 500 and 600° C., said quantity being in excess of the solubility of said metal in said bismuth.

References Cited in the file of this patent

Bremar et al., USAEC Document, AEC-2730, declassified Nov. 2, 1949, 7 pages.

Nuclear Engineering, Pt. I, Chemical Engineering Progress Symposium Series, No. 11, vol. 50 (1954), American Institute of Chemical Engineers, pp. 245–252 (an article by Williams et al.).

BNL-1782, LMFR Progress Letter for February 1954. Mar. 10, 1954, page 2.

Teitel et al.: "Nucleonics," July 1954, pp. 14, 15.